United States Patent

Wiesgickl

Patent Number: 5,239,283
Date of Patent: Aug. 24, 1993

[54] CIRCUIT ARRANGEMENT FOR COMPENSATING FOR THE INFLUENCE OF TEMPERATURE ON COIL QUALITY

[75] Inventor: Bernhard Wiesgickl, Vilseck, Fed. Rep. of Germany

[73] Assignee: Siemens Aktiengesellschaft, Munich, Fed. Rep. of Germany

[21] Appl. No.: 901,385

[22] Filed: Jun. 19, 1992

[30] Foreign Application Priority Data

Jun. 28, 1991 [EP] European Pat. Off. ......... 91110764.7

[51] Int. Cl.$^5$ ............................................... H61C 7/06
[52] U.S. Cl. .................................... 338/10; 338/22 R
[58] Field of Search ............... 338/10, 22 R, 225 D; 334/5, 6

[56] References Cited

U.S. PATENT DOCUMENTS

| | | | |
|---|---|---|---|
| 381,304 | 4/1888 | Weston | 338/10 |
| 1,094,733 | 4/1914 | Lyle | 338/10 |
| 1,884,877 | 10/1932 | Rypinski | 338/10 |
| 2,769,092 | 10/1956 | Pruitt | 250/40 |
| 3,577,209 | 5/1971 | Perkins | 338/22 R X |
| 4,117,371 | 9/1978 | Van Vliet et al. | 315/46 |

FOREIGN PATENT DOCUMENTS

| | | |
|---|---|---|
| 0070796 | 1/1983 | European Pat. Off. . |
| 2010134 | 9/1971 | Fed. Rep. of Germany . |
| 2422503 | 11/1975 | Fed. Rep. of Germany . |
| 3526560 | 2/1987 | Fed. Rep. of Germany . |

*Primary Examiner*—Marvin M. Lateef
*Attorney, Agent, or Firm*—Kenyon & Kenyon

[57] ABSTRACT

To compensate for the temperature dependence of a resonant circuit, it is known to use an a.c. current source, with which the resonant circuit is excited in dependence upon the ohmic resistance of the coil conductor material. The task of compensating for temperature may to be solved without a costly closed-loop control process and with few losses. A magnetically coupled second coil is connected in parallel with the first coil to be compensated, and an NTC thermistor is connected in series with one of the two coils so that the series connection is connected in parallel with the other of the two coils. The NTC thermistor is selected so that, in conjunction with the two variable sized ohmic resistors of the two coils, the circuit arrangement has a specified total ohmic resistance, which is substantially independent of temperature.

9 Claims, 2 Drawing Sheets

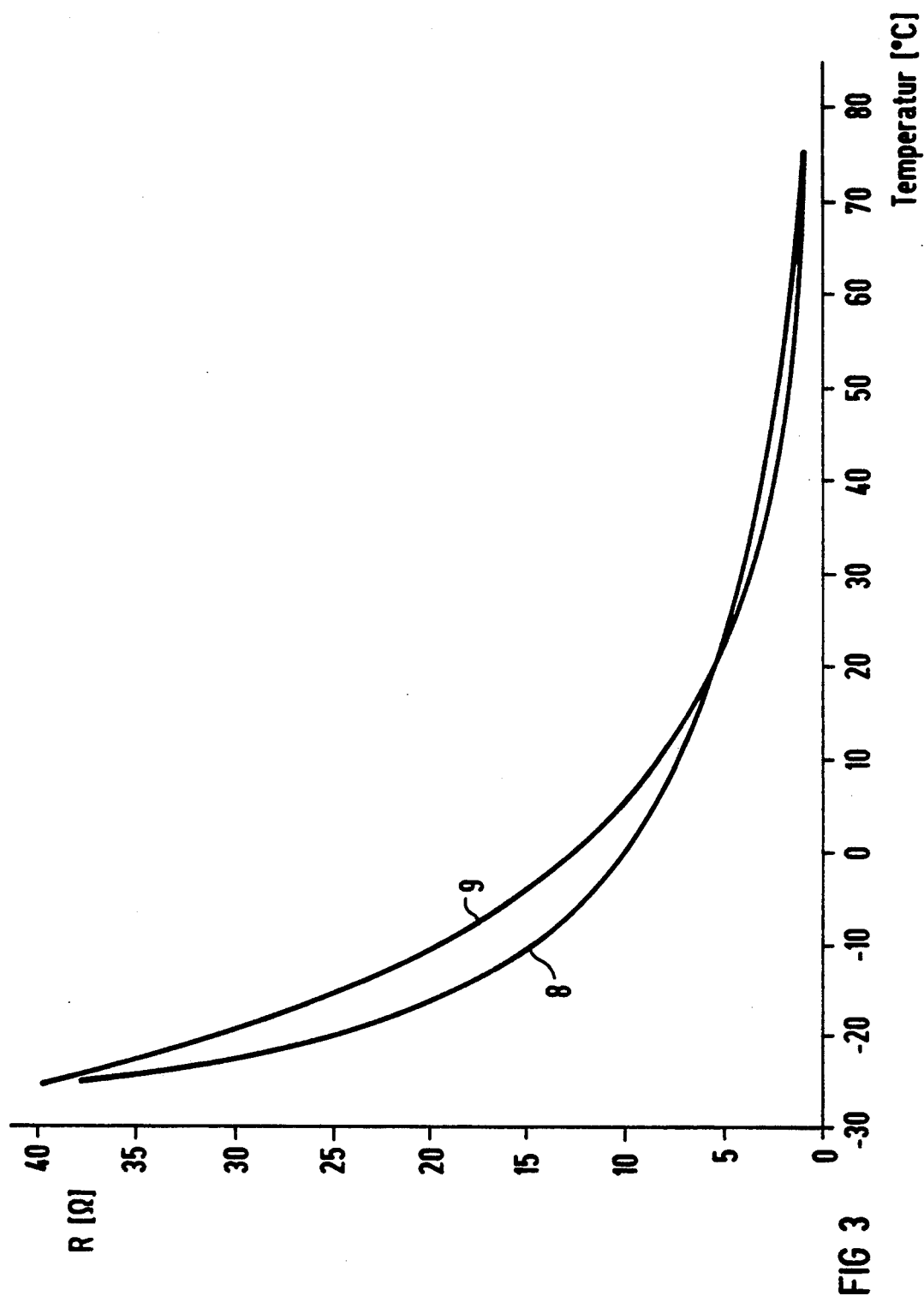

CIRCUIT ARRANGEMENT FOR COMPENSATING FOR THE INFLUENCE OF TEMPERATURE ON COIL QUALITY

BACKGROUND OF THE INVENTION

The present invention relates to a circuit arrangement for compensating for the influence of temperature on coil quality, the circuit arrangement having a first coil with N1 turns, which contains a first inductor and a first ohmic resistor, and having a second coil with N2 turns, which is magnetically coupled and connected in parallel with the first coil and contains a second inductor and a second ohmic resistor.

A circuit arrangement disclosed by the reference DE 35 26 560 A1 deals with a problem of temperature dependence for an inductive sensor, which is operated with an inductor to measure distances or displacement positions. The dependency on temperature, which is disturbing in this case, comes about because of the temperature coefficient response to temperature changes of the coil wire. Therefore, the inductive sensor is designed in a way that allows the temperature dependence of the measured values to be reduced. To this end, a magnetically coupled auxiliary winding is allocated to the inductor and an NTC (negative temperature coefficient) thermistor is connected up to this auxiliary winding. In this case, the auxiliary winding is electrically isolated and shunted out via the NTC thermistor. Accordingly, relatively high currents flow in the auxiliary winding, which results in correspondingly high losses.

The German Published Patent Application 20 10 134 discloses a circuit arrangement for inductively measuring the position or displacement of a test object, having a transformer, whereby the test object lies between the primary and secondary winding of the transformer. With this configuration, the position or change in position of the test object is supposed to be measured. The intention is to reduce or even eliminate measuring errors due to variations in the temperature of the test object and the resultant highly temperature-dependent magnetic properties. To achieve this, an additional element, which compensates for the temperature dependence of the permeability of the test object, is allocated to the primary winding of the transformer and is included in its electric circuit. The following solutions are proposed for the compensating element. The element is, for example, an additional and temperature-dependent inductor that is connected in series with the primary winding. However, it can also be conceived as a resistor connected in series with the primary winding or as a resistor bank having positive temperature coefficients. A further development of the element consists of connecting a resistor or a resistor bank having negative temperature coefficients parallel to the primary winding. In the case of the described circuit arrangement, emphasis is placed on the temperature dependence of the permeability of the test object when a transformer is used.

The European patent document EP 0 070 796 introduces a method for compensating for the temperature dependence of the oscillatory amplitude of a resonant circuit excited by a generator. From the coil of the resonant circuit made out of litz wire (i.e., stranded or flexible wire), one litz wire is separated from the other at one connection of the coil and is brought out to a separate terminal, so that the coil situated between these two connections can be regarded as doubly wound. The combined effect of the inductances of both windings is neutralized in this case, and the connection to the coil of one single litz wire makes it possible to determine the resistance of the conductor material of this coil. A constant a.c. current source, with which the resonant circuit is excited to its resonant frequency, is connected up between the two named connections. A voltage, which is proportional to the resistance of the determined conductor material of the single-wire coil, is injected through the resonant circuit and, accordingly, becomes greater when the temperature rises and is reversed when contrary temperature conditions prevail. The temperature-dependent quality of the resonant circuit can be compensated for through the a.c. current source. However, it is a costly closed-loop control process to compensate by means of an a.c. current source. In this process, the resistance of the single-wire coil must first be measured and, in dependence upon this, the resonant-circuit voltage must be controlled to obtain, for example, a certain quality of the resonant circuit independently of temperature. Besides the expenditure of time and energy that this solution entails, the losses that occur are problematic in some applications when the coil or the resonant circuit are used in units with the lowest possible required power.

SUMMARY OF THE INVENTION

Therefore, the present invention relates to a circuit arrangement for compensating for the influence of temperature on the quality of a first coil, in which the quality of the compensated coil is only slightly reduced compared to the quality of a coil for which the influence of temperature has not been compensated. In the present invention, the power demand remains as low as possible while only passive elements are used.

The first coil has a first inductor and a first ohmic resistor which is variable in size. A second coil magnetically coupled to the first coil is connected in parallel with the first coil. The second coil has a second inductor and a second ohmic resistor which is variable in size, as well as N2 turns, whereby the number of turns N2 of the second coil deviates from a number of turns N1 of the first coil at the most by 10%. Furthermore, an NTC thermistor is connected in series with the second coil so that this series connection is connected in parallel with the first coil. The NTC thermistor is selected so that, in conjunction with the first and second variable ohmic resistors, a specified total ohmic resistance $R_g$ of the circuit arrangement is produced which is nearly independent of temperature. It is advantageous that the inductance from the two parallel-connected, magnetically coupled coils does not deviate considerably from the inductance of the first coil, and that a specific quality is able to be attained for the coils simply by properly dimensioning the ohmic resistors of the two coils and the NTC thermistor adapted to them. A useful specific embodiment of the mentioned circuit arrangement consists in varying the size of the two ohmic resistors of the two coils through the appropriate selection of the conductor cross-section.

A specific embodiment includes a circuit arrangement having a simple design for the two coils with the required number of litz wires and, in connection with this, the determination of a suitable NTC thermistor for producing an inductance of a certain quality. If the number of turns N1 of the first coil is equal to the number of turns N2 of the second coil, then by this means one arrives at the total inductance of the circuit arrangement on the basis of the size of the first inductor of the first coil.

An application of a circuit arrangement for a resonant circuit proves to be useful when the circuit arrangement requires a temperature-independent quality of the resonant circuit. If the circuit arrangement is a component of an inductive proximity switch, then one can dispense with the previously applied, costly temperature compensation of the sensing distance, whose solution was, for example, a temperature-dependent correction of a trimming resistor with a parallel NTC thermistor. Compensating for the influence of temperature on the quality of the coil, as foreseen by the present invention, makes it possible for large sensing distances to be realized for inductive proximity switches in a simple and cost-effective manner.

BRIEF DESCRIPTION OF THE DRAWINGS

A specific embodiment of the present invention will be clarified in greater detail in the following description taken in conjunction with the accompanying drawings, wherein:

FIG. 3 illustrates a diagram with temperature coefficients of the ohmic resistor for an ideal and an actually existing NTC thermistor.

DETAILED DESCRIPTION

Figure 1:
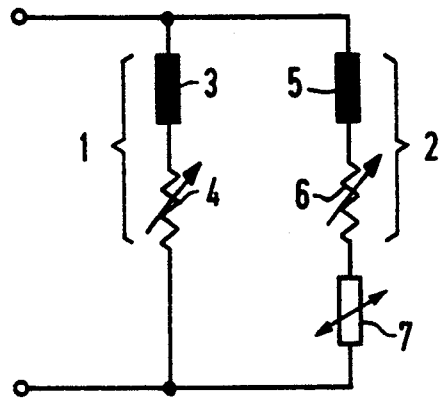
FIG. 1 depicts an equivalent circuit diagram of a circuit arrangement for compensating for the influence of temperature on coil quality.

FIG. 1 depicts the equivalent circuit diagram of two coils 1, 2, which are magnetically coupled and connected in parallel. The first coil 1 has N1 turns, a first inductor 3, and a first variable ohmic resistor 4 and the second coil 2 has N2 turns, a second inductor 5, and a second variable ohmic resistor 6. An NTC thermistor 7 is connected in series with the second coil 2 is and has another connecting point contacted by the first coil. Thus, first coil 1 is connected in parallel with the series connection of coil 2 and NTC thermistor 7. When the number of turns N1 and N2 of both coils 1, 2 coincides, a total inductance of the circuit arrangement is obtained from the size of the first inductor 3 of the first coil 1.

Figure 2:
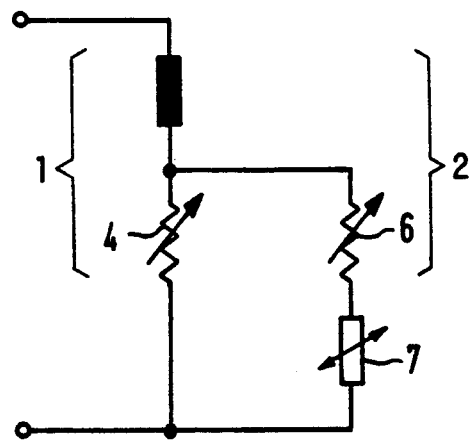
FIG. 2 shows a simplified equivalent circuit diagram of the circuit arrangement according to FIG. 1 with coils having the same number of turns (i.e., N1=N2)

The circuit arrangement according to FIG. 1 can be shown in a simplified representation by the equivalent circuit diagram according to FIG. 2. From this, one can recognize that the ohmic total resistance $R_g$ of the circuit arrangement consists of a parallel connection of two resistor branches, whereby the first ohmic resistor 4 is situated in one branch and the other branch contains in a series connection consisting of the second ohmic resistor 6 and the NTC thermistor 7. By properly selecting the conductor cross-section for the coils, ohmic resistors 4, 6 can be varied, so that in connection with the NTC thermistor 7, the specified total ohmic resistance $R_g$ can be reached. The conductor cross-section can easily be varied because a corresponding number of single litz wires is used for the coils. According to this solution, the setpoint value is determined for the ohmic resistance $R_t$ of a fictitious NTC thermistor in dependence upon the total number n of litz wires for both coils, the litz number m for the compensation winding, that is the coil 2, the resistance of a single litz wire R, and upon the desired value for the ohmic total resistance $R_g$, according to the following equation:

$$R_t = \frac{R \cdot (R_g \cdot n - R)}{m \cdot R - R_g \cdot m \cdot (n - m)}$$

In this case, the resistance of the single litz wire R is temperature-dependent in accordance with the following formula:

$$R = R_o \cdot (1 + \alpha \cdot \Delta T)$$

Here, $R_o$ is the resistance of a single litz wire at a specific temperature, whereby $\alpha$ is the temperature coefficients for litz, and $\Delta T$ is the change in temperature.

The mentioned relationships make it clear that with the degrees of freedom given in the above equation, for example the total litz number n, the litz number m for the compensation winding, variation possibilities exist, which make it possible for the characteristic curve for ohmic resistance to be favorably adapted in dependence upon the temperature for an actually existing NTC thermistor. To clarify the procedure, a diagram is depicted in FIG. 3, with the temperature coefficient of the ohmic resistance of an NTC thermistor calculated according to the above formula $R_t$ as shown by curve 8, as well as with a second characteristic curve 9, which represents a temperature coefficient of the ohmic resistor for an actually existing NTC thermistor. Therefore, on the basis of the calculations, it is possible to find a good adaptation of a setpoint characteristic curve to actually existing NTC thermistor characteristic curves.

The circuit arrangement of the present invention is advantageous in those applications in which importance is attached to a nearly temperature-independent quality of an inductance. This applies, for example, to resonant circuits, whose quality should be as constant as possible in spite of temperature fluctuations and, in particular, also to inductive proximity switches. Up until now, a temperature compensation of the sensing distance was undertaken for proximity switches by compensating for a trimming resistor in dependence upon temperature with a parallel-connected NTC thermistor. The circuit arrangement according to the present invention enables a temperature compensation to be carried out for a proximity switch simply and cost-effectively and thus allows a large sensing distance to be attained.

What is claimed is:

1. A circuit arrangement comprising:
   a first coil having N1 turns, which includes a first inductor and a first variable ohmic resistor; and
   a second coil magnetically coupled with the first coil and having N2 turns, which includes a second inductor and a second variable ohmic resistor, wherein the number of turns N2 of the second coil deviates from the number of turns N1 of the first coil at the most by 10%; and
   an NTC thermistor, which is connected in series with the second coil so that the second coil and the NTC thermistor are connected in parallel with the first coil, the NTC thermistor being selected so that, in conjunction with the two variable ohmic resistors, said circuit arrangement has a specified total ohmic resistance value $R_g$ which is substantially independent of temperature.

2. The circuit arrangement according to claim 1, wherein the size of the two ohmic resistors is varied by appropriately selecting a conductor cross-section associated with each respective ohmic resistor.

3. The circuit arrangement according to claim 1, wherein the first and second coil are wound from litz wire, and a determination of a conductor cross-section, which corresponds to a number of single litz wires, is made starting from the value $R_g$ of the total ohmic resistance of the circuit arrangement and from an agreement between calculated ideal characteristic curves $R_t$ of the ohmic resistance in dependence upon temperature for a fictitious NTC thermistor and characteristic curves of available NTC thermistors on the basis of the following equation:

$$R_t = \frac{R \cdot (R_g \cdot n - R)}{m \cdot R - R_g \cdot m \cdot (n - m)}$$

where
$R = R_o(1 + \alpha \cdot \Delta T)$; and
wherein
$n =$ the total litz number;
$m =$ a number of litz wires for the second coil;
$R_g =$ the setpoint value of the total ohmic resistance of the circuit arrangement;
$R =$ the resistance of a single litz wire;
$R/(n-m) =$ the ohmic resistance of the first coil;
$R/m =$ the ohmic resistance of the second coil;
$R_o =$ the resistance of a single litz wire at a specific temperature;
$\alpha =$ the temperature coefficient; and
$\Delta T =$ the change in temperature.

4. The circuit arrangement according to claim 2, wherein the first and second coil are wound from litz wire, and a determination of a conductor cross-section, which corresponds to a number of single litz wires, is made starting from the value $R_g$ of the total ohmic resistance of the circuit arrangement and from an agreement between calculated ideal characteristic curves $R_t$ of the ohmic resistance in dependence upon temperature for a fictitious NTC thermistor and characteristic curves of available NTC thermistors on the basis of the following equation:

$$R_t = \frac{R \cdot (R_g \cdot n - R)}{m \cdot R - R_g \cdot m \cdot (n - m)}$$

where
$R = R_o(1 + \alpha \cdot \Delta T)$; and
wherein
$n =$ the total litz number;
$m =$ a number of litz wires for the second coil;
$R_g =$ the setpoint value of the total ohmic resistance of the circuit arrangement;
$R =$ the resistance of a single litz wire;
$R/(n-m) =$ the ohmic resistance of the first coil;
$R/m =$ the ohmic resistance of the second coil;
$R_o =$ the resistance of a single litz wire at a specific temperature;
$\alpha =$ the temperature coefficient; and
$\Delta T =$ the change in temperature.

5. The circuit arrangement according to claim 1, wherein the number of turns N1 of the first coil is equal to the number of turns N2 of the second coil.

6. The circuit arrangement according to claim 2, wherein the number of turns N1 of the first coil is equal to the number of turns N2 of the second coil.

7. The circuit arrangement according to claim 1, wherein the circuit arrangement is a component of a resonant circuit.

8. The circuit arrangement according to claim 1, wherein the circuit arrangement is a component of an inductive proximity switch.

9. The circuit arrangement according to claim 1, wherein the first coil is a coil for which an influence of temperature is to be compensated.

* * * * *